J. DAVIES & F. B. CHIDESTER.
Lathe for Turning and Molding Balusters.
No. 218,863. Patented Aug. 26, 1879.
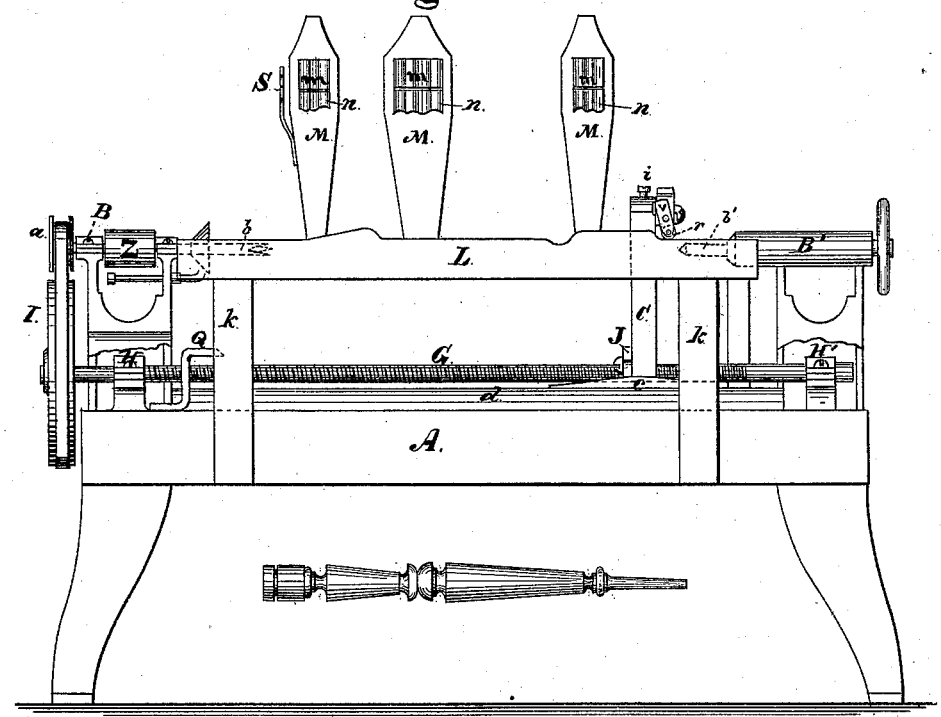
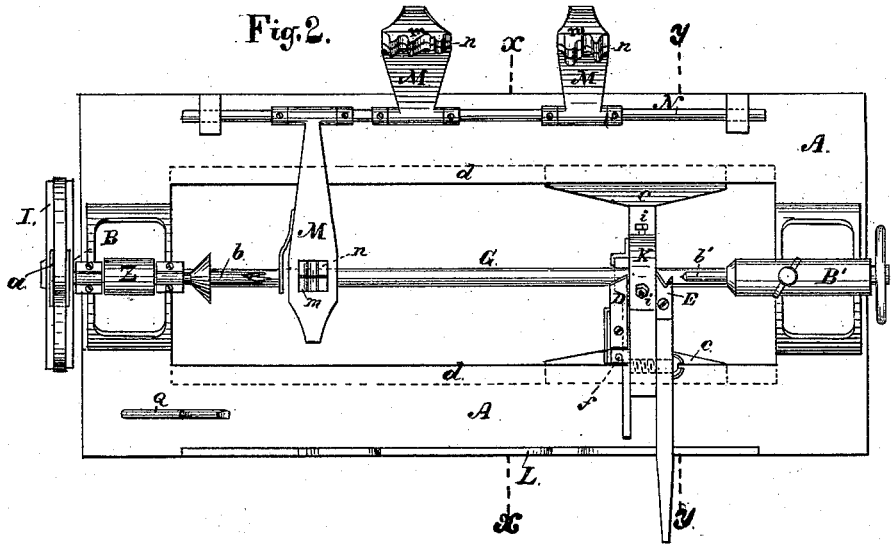
Witnesses:
Henry Eichling
Henry L. White
George Holmes
Inventor's
James Davies
Foster B. Chidester 2 Sheets—Sheet 2.

J. DAVIES & F. B. CHIDESTER.
Lathe for Turning and Molding Balusters.

No. 218,863. Patented Aug. 26, 1879.

Witnesses:
Henry S. White
George Holmes

Inventors
James Davies
Foster B. Chidester

N. PETERS, PHOTO-LITHOGRAPHER, WASHINGTON, D.C.

UNITED STATES PATENT OFFICE.

JAMES DAVIES AND FOSTER B. CHIDESTER, OF JERSEY CITY, NEW JERSEY, ASSIGNORS OF ONE-THIRD THEIR RIGHT TO LEWIS H. BROOME, OF SAME PLACE.

IMPROVEMENT IN LATHES FOR TURNING AND MOLDING BALUSTERS.

Specification forming part of Letters Patent No. 218,863, dated August 26, 1879; application filed February 21, 1879.

*To all whom it may concern:*

Be it known that we, JAMES DAVIES and FOSTER B. CHIDESTER, both of Jersey City, in the county of Hudson and State of New Jersey, have invented a new and useful Improvement in Lathes for Turning and Molding Balusters and similar articles, of which the following is a specification.

This invention relates to lathes, and is especially designed for turning and molding balusters and similar articles; and consists in a cutter-carrier arranged to move in the line of the spindles, and provided with an automatically-expanding ring to clamp the work near the point where the cutters operate; the adjustable cutter D, in combination with the expanding-ring F; the expanding-ring F, in combination with the cutter E and the form or pattern L; the combination of the pivoted cutter E, the block $v$, the stops $s$ $s$, and the form L; the combination of the molding cutters and gages and the cutter-holders M M M; the combination of the molding-cutters detached from the movable cutter-carrier and a clamping device attached to such movable cutter-carrier; and, in combination with a molding cutter-holder, a cutter, S, provided with saw-teeth, all substantially as and for the purposes hereinafter more fully set forth and shown.

The invention is illustrated in the accompanying drawings, (two sheets,) in which—

Figure 5:
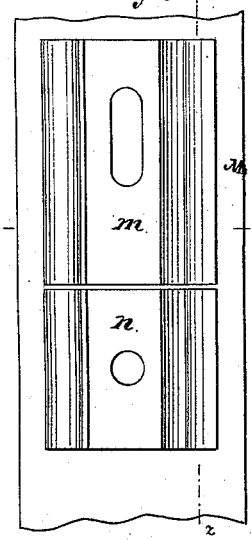
Figure 7:
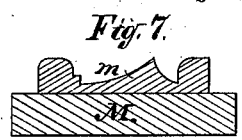
Figure 3:
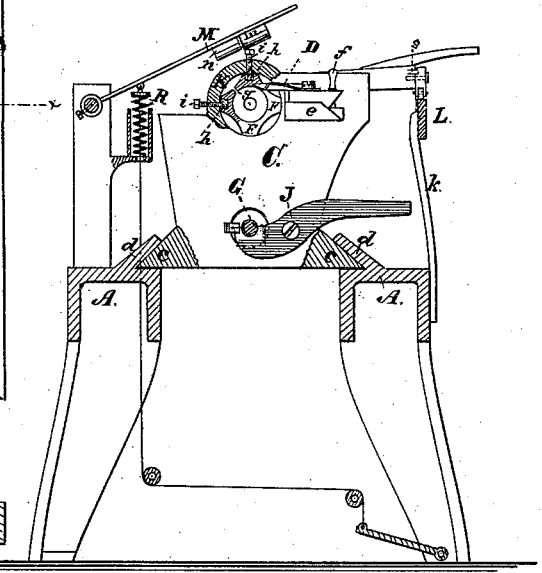
Figure 6:
Figure 4:
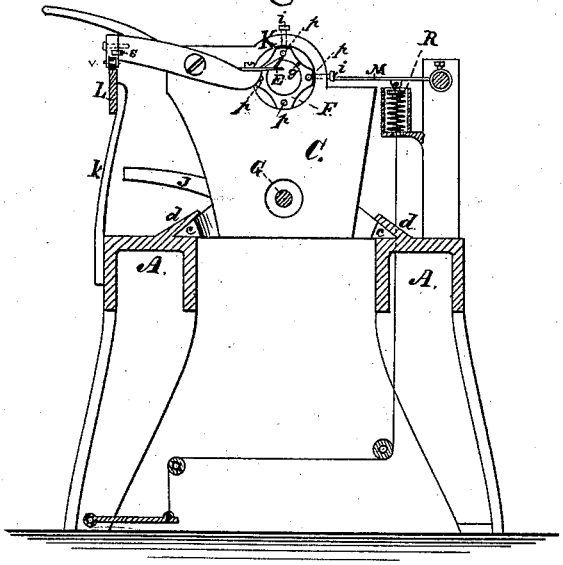

Figure 1 is a front elevation of the lathe with a finished baluster. Fig. 2 is a plan view of the lathe. Fig. 3 is a cross-section in the line $x$ $x$ of Fig. 2, to show the face of the cutter-carrier next the head-stock, the expanding ring or die being partly in section. Fig. 4 is a cross-section on the line $y$ $y$ of Fig. 2, to show the cutter-carrier next the tail-stock, and other devices; and Figs. 5, 6, and 7 are detailed views of the molding-cutters and cutter-gages mounted upon their holders—Fig. 5 being a plan view, Fig. 6 a section through the line $z$ $z$ of Fig. 5, and Fig. 7 a section through the line $x$ $x$ of Fig. 5.

In these drawings, A represents the bed of a lathe, which may be of any material, and of any general construction adapted for the purpose designed. $b$ and $b'$ are spindles, connected with their respective head and tail stocks B and B', all of which are constructed and operated in the usual manner of spindle-lathes, the power being applied to the driving-pulley Z.

C is a carrier for the cutters D and E and the expanding ring or die F, and is moved to and fro between, and on the line of, the spindles by means of appropriate mechanism. Its forward movement toward the head-stock B is effected by means of a revolving feed-screw, G, journaled at H and H', near the bed of the lathe, and having one of its ends connected to the center of the wheel I, by which it is revolved, the wheel I being driven by a connection with the pulley $a$ on the spindle $b$, or by any other desired means. The feed-screw passes through the lower part of the carrier C, and is brought into and thrown out of engagement with it by means of an adjustable lever, J, pivoted to the carrier, and having its head provided with a half-nut threaded to conform to the screw G.

To the lower part of the carrier are attached runners $c$ $c$, which slide in the ways $d$ $d$ as the carrier is moved forward and backward. When the carrier has advanced to the end of the work, the projecting arm of the lever J rides up the incline of a check-bar, Q, secured to the bed, and throws the threaded head of this lever out of engagement with the screw. The carrier may be returned to its former position next the tail-stock by reversing the revolution of the screw G, by bringing it into engagement with a second coarse-threaded screw, or by attaching it to an endless rope or band, or by any other means in common use.

The cutter D is adjustable in its holder or frame $e$ by means of a screw, $f$, whereby its cutting-edge can be elevated or depressed to trim the blank to different diameters, as may be desired, so as to pass through different rings, or through the same ring, which is practicable by reason of the expanding capacity of the ring.

The expanding-ring F consists of a metal case with an aperture through its center to permit the passage of the blank after it has been trimmed by the cutter D, and is rendered capable of slight expansion, to accommodate itself to any inequalities or varying condition of moisture of the trimmed blank, by being cut or divided as shown at $g$, Fig. 3, and by the insertion of blocks of india-rubber or other elastic material in connection with bearing-screws. This construction is also shown in Fig. 3, the elastic material being represented by $h\,h$, and the screws by $i\,i$. By turning the screws down upon the blocks of rubber the case of the ring will be pressed down from the frame in which it is fixed and the opening $g$ partially closed, so that when a greater pressure is exerted upon the interior of the ring it can expand by contracting the rubber blocks and increasing the width of the opening $g$ until the ring strikes against the frame. This construction gives to the ring the capacity of expanding automatically by the simple forcing of the blank against its walls, so that if, for any reason, the cutter D fails to trim the blank so that it would pass readily through the ring, or if, owing to moisture in the blank, it would bind too firmly against the walls of the ring if solid or unyielding, the ring thus constructed accommodates itself to these conditions and permits the blank to pass without difficulty, and at the same time clamps the blank near the point where the cutters operate upon it, and thus overcomes the serious difficulty resulting from the spring and tremble of the blank which takes place when it is supported only by the spindles. This ring or die is secured in the frame or socket K in such way that its center is on a line with the spindles, and is so constructed and applied that it can be readily removed and other rings for different-sized blanks be substituted. Small holes $p\,p\,p\,p$ are formed through the case of the ring to admit a current of air to prevent it from becoming overheated by the friction of the blank.

The cutter E is pivoted at or near a point midway of its cutting-edge and the pattern or form L, by which it is adjusted and which gives general shape to the blank. The edge of this cutter is dovetailed, with one wing inclined upward, while the other is nearly level. This dovetail shape brings the cutting-edges diagonal to the grain of the blank, and produces smoother and more even work with less power than the ordinary forms of cutters. The upwardly-inclined wing or cutting-edge gives the main depth of cut, while the horizontal wing or part takes off only a thin shaving and leaves the work smooth.

L is a pattern or form fixed to the standards $k\,k$, secured to the bed of the lathe, and having its upper edge of the reverse shape or configuration which is to be given to the blank by the cutter E. The pattern may be made adjustable by means of slots and set-screws formed in the standards $k\,k$. The arm of the cutter E is provided with a friction-roller, $r$, which rides over the upper edge of the pattern L, and thereby gives the reverse motion to the cutting-edge and the reverse shape to the blank. The friction-roller $r$ is mounted in a block, $v$, pivoted to the cutter-arm, and on each side of this block are stops $s\,s$, one of which keeps the block in nearly a perpendicular position when the cutter is advancing, while the other permits the block to take an inclined position, and thus to raise the cutting-edges, so as not to mar the finished work when the cutter is being moved back. If the cutter E is pivoted at a point nearer the form L this form can be of less size and the curves of its contour less abrupt. In many cases this is desirable, as the friction of the cutter-arm can thereby be considerably diminished.

M M M are adjustable cutter-holders, carrying cutters $m\,m\,m$, for forming moldings upon the work after it has been shaped by the cutters mounted on the carrier C.

$n\,n\,n$ are cutter-gages, mounted on the holders below the cutters—that is, nearer the hinge. Both the gages and the cutters are the reverse in shape of the moldings which it is desired to cut on the balusters, and are arranged so that when brought down upon the work the cutting-edges of the cutters will occupy planes slightly below corresponding parts of the gages, as seen in section in Fig. 6. The cutters may be adjustable by set-screws operated from the back of the holders, so that their cutting-edges can be raised or depressed relatively to the planes of the gages.

By the use of molding cutters and gages constructed and arranged in this way more ornamental and perfect, as well as a greater variety of, moldings can be cut—$e.\ g.$, heretofore it has been only practicable to turn moldings in the form of coves and beads, from the lack of some proper device to govern the cutting-tools, while with this construction feather edges, perpendicular cuts, and many other styles which have been impracticable, or only produced with great care and difficulty, are easily formed without any marring or tearing of the wood.

S is a cutter, provided with saw-teeth, attached to the cutter-holder next the head-stock of the lathe, to cut a kerf near the end of the baluster at the same time the last molding is cut. This kerf or cut is to assist to form the usual dovetail by which the baluster is secured to the stairs.

The use of saw-teeth on a cutter used in this way for cutting a narrow perpendicular kerf is much less liable to scorch the wood than a cutter with a continuous edge.

These molding-cutter holders are conveniently hinged to a stationary bar, N, located in the rear of the lathe, and may be swung down upon the work by means of treadles beneath the bed of the lathe, and connected with the cutters by means of pulleys and cords, as shown in Figs. 3 and 4, or in any other convenient way.

The holders may be adjusted longitudinally on the bar N, so that the moldings may be varied in their positions on the balusters, and can be readily removed and others substituted; but wherever located on the bar N it is designed to cut the moldings as soon as the desired part of the baluster has passed the ring and been shaped by the cutter E, so that the clamping of the ring may hold the piece fast and firm while each of the molding-cutters does its work as well as when the cutters D and E operate upon it.

The cutter-holders are also provided with slots or openings in the rear of the cutter-edges, through which the shavings can readily pass. One of these openings is shown in Fig. 6, and is designated by the letter O.

The cutters $m\ m\ m$ are easily removable from their holders, being so constructed that they can be slipped into grooves in the holders and secured by screws or other ordinary means, and may be of any size and shape that may be required for the molding.

R R R are springs attached to the cutters and resting upon brackets or posts secured to the lathe, and their function is to remove the cutters from the piece after they have done their work and restore them to their normal positions.

These molding-cutters, instead of being hinged to be brought down upon the work, may be mounted upon sliding tables, which may be arranged to be brought up by treadles or levers, to cut the moldings upon the side of the piece instead of upon its top, as hereinbefore described.

The operation of the machine above described is as follows: When the carrier C is in position so that the spindle $b'$ projects through the ring F, the blank is inserted and the carrier brought into engagement with the screw G. As the carrier advances the cutter D trims the blank, which is generally square, to a cylindrical form, which will pass through the ring F. The cutter E, guided by the pattern L, operates just behind the ring F, where the blank is firmly clamped, and shapes it to the reverse of the pattern. Whenever it is desired to form a molding upon the piece, one of the molding-cutters is brought down upon it as closely to the cutter E as convenient, in order to avail of the support given by the clamping-ring F. When the carrier has reached the spindle $b$, as many moldings as desired may have been cut, and the piece is finished, as shown in Fig. 1.

What is claimed as new is—

1. A cutter-carrier arranged to move in the line of the spindles, in combination with an automatically-expanding ring to clamp the work near the point where the cutters operate, substantially as set forth.

2. An adjustable cutter, D, in combination with the automatically-expanding ring, F, substantially as and for the purpose set forth.

3. The combination of the expanding-ring F, the pivoted cutter E, and the form or pattern L, substantially as and for the purpose set forth.

4. The combination of the pivoted cutter E, the adjustable block $v$, the stops $s\ s$, and the form L, substantially as and for the purpose set forth.

5. In combination with the cutter-holder M M M, the molding-cutters $m\ m\ m$ and the molding-cutter gages $n\ n\ n$, substantially as and for the purpose set forth.

6. The combination of the molding cutters and gages with the holders M M M, provided with the openings O, substantially as and for the purpose described.

7. The combination of molding-cutters detached from the movable cutter-carrier and a clamping device attached to such movable cutter-carrier, substantially as and for the purpose described.

8. The combination of a molding-cutter holder and a cutter, S, provided with saw-teeth, when constructed and arranged, substantially as described, to form a molding and kerf at the same time, substantially as set forth.

JAMES DAVIES.
FOSTER B. CHIDESTER.

Witnesses:
HENRY S. WHITE,
GEORGE HOLMES.